US012775482B2

(12) United States Patent
Grest et al.

(10) Patent No.: US 12,775,482 B2
(45) Date of Patent: Oct. 27, 2026

(54) HIERARCHICAL VIRTUALIZATION

(71) Applicant: Microsoft Technology Licensing, LLC, Redmond, WA (US)

(72) Inventors: Alexander Daniel Grest, Redmond, WA (US); David Alan Hepkin, Redmond, WA (US); Bruce J. Sherwin, Jr., Woodinville, WA (US); Matthew Jordan Sebek, Bellevue, WA (US); Sai Ganesh Ramachandran, Sammamish, WA (US); Xin David Zhang, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 673 days.

(21) Appl. No.: 18/069,832

(22) Filed: Dec. 21, 2022

(65) Prior Publication Data

US 2024/0211288 A1 Jun. 27, 2024

(51) Int. Cl.
*G06F 9/455* (2018.01)

(52) U.S. Cl.
CPC .................... *G06F 9/45558* (2013.01); *G06F 2009/45566* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 8,327,353 | B2 | 12/2012 | Traut | |
| 2021/0216344 | A1* | 7/2021 | Tsirkin | G06F 9/542 |
| 2022/0413884 | A1* | 12/2022 | Tsirkin | G06F 9/4812 |
| 2023/0185593 | A1* | 6/2023 | Tsirkin | G06F 9/45558 718/1 |
| 2023/0259464 | A1* | 8/2023 | Evans | G06F 12/1072 711/163 |
| 2023/0305875 | A1* | 9/2023 | Tsirkin | H04L 47/62 |
| 2024/0086228 | A1* | 3/2024 | Hu | G06F 9/4856 |

OTHER PUBLICATIONS

Ben-Yehuda, Muli, et al., "The turtles project: Design and implementation of nested virtualization.", 9th USENIX Symposium on Operating Systems Design and Implementation (OSDI 10). Sep. 23, 2010, 14 Pages.

(Continued)

*Primary Examiner* — Wynuel S Aquino
(74) *Attorney, Agent, or Firm* — Workman Nydegger

(57) ABSTRACT

Hierarchical virtualization creates a child guest partition that shares a hypervisor with a parent guest partition. A hypervisor receives a request, from a first guest partition that operates at the hypervisor, to create a second guest partition as a child of the first guest partition. The hypervisor identifies a configuration specification for the second guest partition, which includes (1) an identification of a memory portion, which is allocated to the first guest partition, that is to be mapped into the second guest partition; and (2) a configuration of a virtual processor that is to be utilized by the second guest partition. The hypervisor creates the second guest partition based on the configuration specification.

20 Claims, 8 Drawing Sheets

(56) References Cited

OTHER PUBLICATIONS

International Search Report and Written Opinion received for PCT Application No. PCT/US2023/081708 (MS #412060-PCT01), Mar. 13, 2024, 13 pages.
Kauer, et al., "Recursive virtual machines for advanced security mechanisms.", 2011 IEEE/IFIP 41st International Conference on Dependable Systems and Networks Workshops (DSN-W), IEEE, Jun. 27, 2011, pp. 117-122.
International Preliminary Report on Patentability (Chapter 1) received for PCT Application No. PCT/US2023/081708 (MS #412060-PCT01), mailed on Jul. 3, 2025, 8 pages.

* cited by examiner

HIERARCHICAL VIRTUALIZATION

BACKGROUND

Virtualization technologies facilitate creation of virtual machines (VMs) that each executes guest software, such as a guest operating system (OS) and applications executing thereon. Virtualization technologies allocate portions of a computer system's physical resources (e.g., central processing unit (CPU) cores and/or time, physical memory regions, storage resources, etc.) into separate isolated partitions, and execute software within each of those partitions. A computer system that hosts VMs is commonly called a virtualization host or a virtualization host node. Virtualization service providers operate virtualization hosts that provide VM hosting services to a plurality of tenants. Examples of virtualization services include AZURE operated by MICROSOFT CORPORATION; AMAZON WEB SERVICES (AWS) operated by AMAZON, INC.; and GOOGLE CLOUD PLATFORM (GCP) operated by GOOGLE LLC.

While virtualization technologies can take a variety forms, many use an architecture comprising a hypervisor that has direct access to hardware and that partitions that hardware among a plurality of partitions, a privileged root partition that executes a host OS and a host virtualization stack, and one or more guest partitions that operate as VMs. The hypervisor grants the root partition many special privileges, as compared to guest partitions, including the ability to directly manage most hardware resources. As examples, this includes the ability to manage a peripheral component interconnect express (PCIe) configuration space, the ability to control CPU power management, the ability to create guest partitions, and the like. Guest partitions are configured by the root partition to have, as examples, a specified number and topology of virtual processors (VPs) with a specified set of CPU features, a certain amount of random-access memory (RAM), a specified non-uniform memory access (NUMA) topology, direct access to one or more PCIe devices, and the like.

Taking HYPER-V from MICROSOFT CORPORATION as one example, the HYPER-V hypervisor is the lowest layer of a HYPER-V stack. The HYPER-V hypervisor provides basic functionality for dispatching and executing VPs for VMs. The HYPER-V hypervisor takes ownership of hardware virtualization capabilities (e.g., virtualization-related instruction set architecture (ISA) extensions, including second-level address translation (SLAT) ISA extensions such as rapid virtualization indexing (RVI) from ADVANCED MICRO DEVICES (AMD), or extended page tables (EPT) from INTEL; an input/output (I/O) memory management unit (IOMMU) that connects a direct memory access (DMA)-capable I/O bus to main memory; CPU virtualization controls). The HYPER-V hypervisor also provides a set of application programming interfaces (APIs) to allow a HYPER-V host stack within a root partition to leverage these virtualization capabilities to manage VMs. The HYPER-V host stack provides general functionality for VM virtualization (e.g., memory management, VM lifecycle management, device virtualization).

Some hypervisor-based virtualization technologies enable a guest partition to be configured with VPs having access to an underlying CPU's virtualization-related ISA extensions, such as RVI, EPT, and the like. This means that a VM based on that guest partition can operate its own nested hypervisor, and potentially create nested VMs using that nested hypervisor. This capability is commonly referred to a "nested virtualization." Some virtualization service providers offer guest partitions having virtualization-related ISA extensions exposed thereto, enabling a tenant to utilize nested virtualization by running a nested hypervisor within the tenant's guest partition and by using that nested hypervisor to create one or more nested VMs within the tenant's guest partition.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

In some aspects, the techniques described herein relate to a method, implemented at a computer system that includes a processor, including: receiving a request, from a first guest partition that operates at a hypervisor, to create a second guest partition as a child of the first guest partition; identifying a configuration specification for the second guest partition, the configuration specification including: an identification of a memory portion, which is allocated to the first guest partition, that is to be mapped into the second guest partition, and a configuration of a virtual processor (VP) that is to be utilized by the second guest partition; and creating the second guest partition at the hypervisor based on the configuration specification.

In some aspects, the techniques described herein relate to a computer system, including: a processing system; and a computer storage media that stores computer-executable instructions that are executable by the processing system to at least: receive a request, from a first guest partition that operates at a hypervisor, to create a second guest partition as a child of the first guest partition; identify a configuration specification for the second guest partition, the configuration specification including: an identification of a memory portion, which is allocated to the first guest partition, that is to be mapped into the second guest partition, and a configuration of a VP that is to be utilized by the second guest partition; and create the second guest partition at the hypervisor based on the configuration specification.

In some aspects, the techniques described herein relate to a computer program product including a computer storage media that stores computer-executable instructions that are executable by a processing system to at least: receive a request, from a first guest partition that operates at a hypervisor, to create a second guest partition as a child of the first guest partition; identify a configuration specification for the second guest partition, the configuration specification including: an identification of a memory portion, which is allocated to the first guest partition, that is to be mapped into the second guest partition, and a configuration of a VP that is to be utilized by the second guest partition; and create the second guest partition based on the configuration specification.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Figure 1:
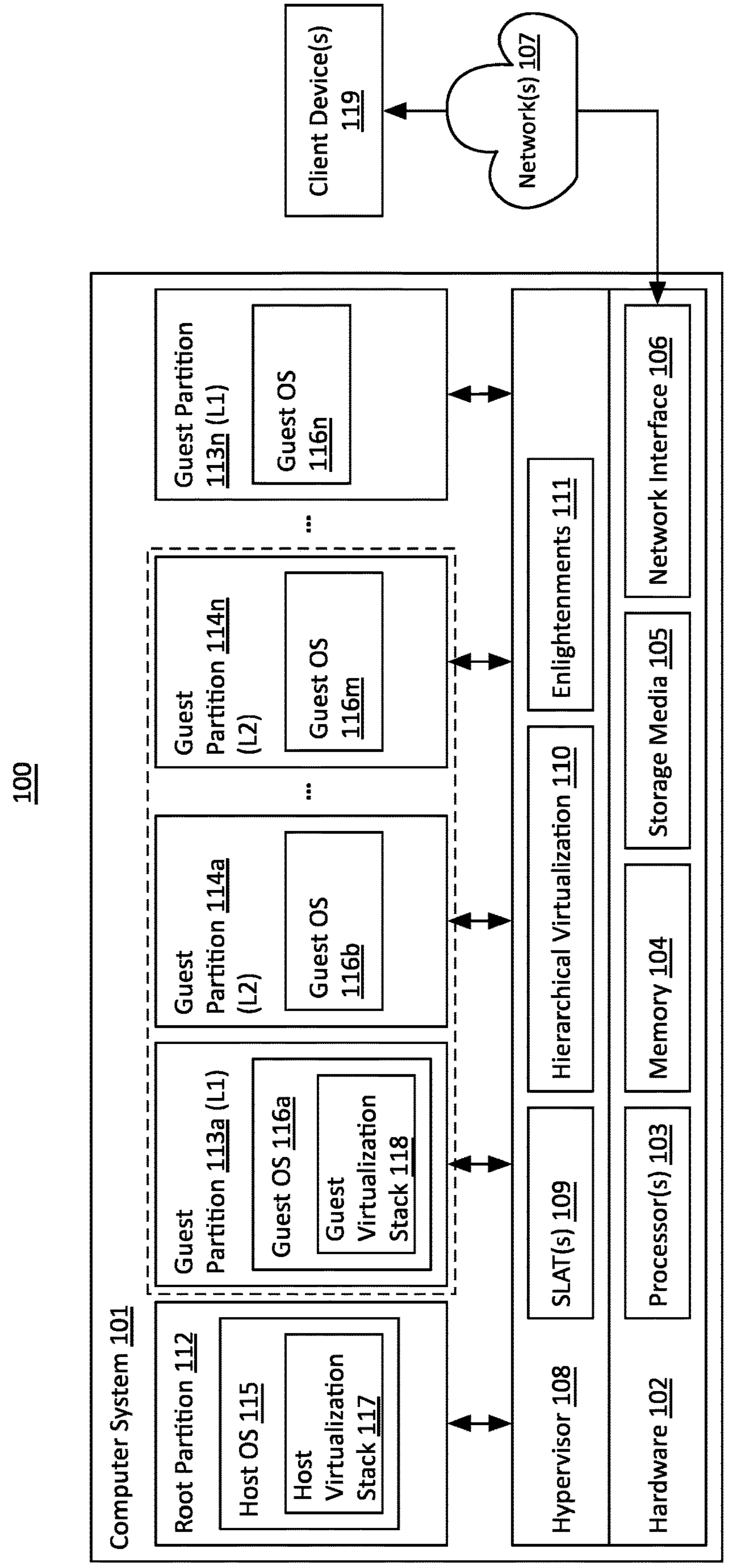
FIG. 1 illustrates an example computer architecture that facilitates using hierarchical virtualization to create a child guest partition that shares a hypervisor with a parent guest partition.

Nested virtualization technologies provide a number of advantages to tenants. Because a tenant operates a nested hypervisor within a guest partition that is under that tenant's control, the tenant has flexibility in the configuration of the nested virtual machines (VMs) that are created by the nested hypervisor. This offers the tenant flexibility in provisioning nested VMs, and can even enable the tenant to provision VMs that use configurations not offered by the virtualization service that provides the underlying guest partition. Additionally, nested virtualization technologies enable a tenant to operate a nested hypervisor that is different than the underlying hypervisor that is used by the virtualization service to create the tenant's guest partition. For example, if a virtualization service uses the HYPER-V hypervisor, a nested hypervisor may be the kernel-based virtual machine (KVM) hypervisor, the XEN hypervisor, etc. This means that the tenant can run a nested hypervisor having a feature set that is different than a feature set of the underlying hypervisor, which can enable the tenant to operate a nested VM running a guest operating system (OS) that is not supported by the underlying hypervisor. Additionally, when a guest partition that comprises a plurality of nested VMs is migrated, that guest partition and all the nested VMs operated therein are migrated together. This means that a tenant can ensure that VMs running related workloads are all migrated together. Nested virtualization also allows tenants to develop tools and workflows that are independent of the underlying hypervisor or virtualization service. For example, a tenant may also have its own tools and/or workflows for provisioning VMs, which ties VM provisioning into tenant's own infrastructure, instead of coordinating with the virtualization service for VM provisioning.

Despite these advantages, nested virtualization technologies have significant drawbacks, particularly relating to performance and resource usage. With respect to performance, when a VM generates an interrupt (e.g., for an input/output operation), that interrupt is intercepted by the hypervisor supporting that VM. This hypervisor may handle the interrupt itself, may pass the interrupt to a root partition, or may pass the interrupt downstream. With a single hypervisor, an interrupt passed downstream goes to hardware. However, with a nested hypervisor, an interrupt passed downstream goes to an underlying hypervisor, which may handle the interrupt itself, may pass the interrupt to a root partition, or may pass the interrupt downstream. Thus, when there is more than one hypervisor in a VMs execution stack (as is the case with nested VMs) the path length of interrupts, and the operations that depend on them, is increased. This increased path length can significantly reduce performance of these operations. With respect to resource usage, there is a resource cost (e.g., in terms of central processing unit (CPU), memory usage, and the like) for operating any hypervisor. Thus, operating a nested hypervisor impacts overall resource availability at a virtualization host. Additionally, operating a nested hypervisor directly consumes resources allocated to a VM operating the nested hypervisor, making those resources unavailable for supporting VM workloads.

The embodiments described herein a directed to hierarchical virtualization techniques, in which a hypervisor provides a parent guest partition an ability to request the creation of additional child guest partitions using a portion of the parent guest partition's resources, thereby enabling the parent guest partition to create additional child VMs that run directly on the same hypervisor that supports the parent guest partition, itself. Thus, much like nested virtualization, the hierarchical virtualization techniques described herein enable a VM to create additional VMs using its own resources. Unlike nested virtualization, however, the hierarchical virtualization techniques described herein operate each of these VMs on the same underlying hypervisor, rather than using a nested hypervisor. By using a single hypervisor to support child VMs, the hierarchical virtualization techniques described herein avoid the drawbacks of nested virtualization, including the performance and resource usage penalties that running additional hypervisor(s) creates. In embodiments, a hypervisor implementing the hierarchical virtualization techniques described herein can present different "personas" to different guest partitions, with each persona including a hypervisor identity and/or a hypervisor feature set. Thus, it may appear to a child VM, that the child VM is operating on a different type of hypervisor than the one on which it is actually operating. In embodiments, the hierarchical virtualization techniques described herein are compatible with nested virtualization, preserving the ability for a tenant to create a nested VM within a hierarchical VM.

The hierarchical virtualization techniques described herein therefore provide each of the advantages of nested virtualization described supra (e.g., flexibility in child VM provisioning, operating a child VM on what appears to the child VM to be a different hypervisor, migrating a guest partition and its child VMs together), while overcoming the drawbacks of nested virtualization described supra. In addition to these distinct advantages, hierarchical virtualization techniques described herein can also preserve compatibility with nested virtualization. Thus, a tenant can, e.g., continue to operate VMs that rely on the tenant's own infrastructure, even within a hierarchical virtualization environment.

FIG. 1 illustrates an example computer architecture 100 that facilitates using hierarchical virtualization to create a child guest partition (child VM) that shares a hypervisor with a parent guest partition (parent VM). As shown, computer architecture 100 includes a computer system 101 comprising hardware 102. Examples of hardware 102 include a processing system comprising processor(s) 103 (e.g., a single processor, or a plurality of processors), a memory 104 (e.g., system or main memory), a storage media 105 (e.g., a single computer-readable storage medium, or a plurality of computer-readable storage media), and a network interface 106 (e.g., one or more network interface cards) for interconnecting (via network(s) 107) to one or more other computer systems (e.g., client device(s) 119). Although not shown, hardware 102 may also include other hardware devices, such as a trusted platform module (TPM) for facilitating measured boot features, an input/output (I/O) memory management unit (IOMMU) that connects a direct memory access (DMA)-capable I/O bus (and any devices connected thereto) to memory 104, a video display interface for connecting to display hardware, a user input interface for connecting to user input devices, an external bus for connecting to external devices, and the like.

As shown, in computer architecture 100, a hypervisor 108 executes directly on hardware 102. In general, hypervisor 108 partitions hardware resources (e.g., processor(s) 103, memory 104) among a root partition 112 within which a host OS 115 executes, as well as one or more guest partitions. In embodiments, hypervisor 108 creates one or more virtual processors (VPs) for each partition and manages use of processor(s) 103 by those VPs, allocates a portion of memory 104 to each partition, and intercepts and routes interrupts generated by each partition, among other things. In embodiments, hypervisor 108 uses second-level address translation (SLAT) to isolate memory allocated to each partition created by hypervisor 108 from other partition(s) created by hypervisor 108. Thus, hypervisor 108 is shown as including one or more SLAT tables (SLAT(s) 109), which map system physical addresses (SPAs) in memory 104 to guest physical addresses (GPAs) that make up each partition's memory space.

In FIG. 1, there are a plurality of level-1 (L1) guest partitions, including guest partition 113*a* that executes guest OS 116*a* to guest partition 113*n* that executes guest OS 116*n*. An ellipsis to the left of guest partition 113*n* indicates that hypervisor 108 could operate any number of L1 guest partitions. Additionally, host OS 115 is illustrated as including a host virtualization stack 117, which uses application program interface (API) calls to hypervisor 108 to create, manage, and destroy at least L1 guest partitions operating at hypervisor 108. In embodiments, host virtualization stack 117 makes decisions about which portion(s) of memory 104 to allocate to each guest partition, operates para-virtualized drivers that multiplex guest partition access to physical hardware devices (e.g., storage media 105, network interface 106), and facilities limited communications among partitions via a VM bus, among other things.

In FIG. 1, hypervisor 108 includes a hierarchical virtualization component 110 and guest OS 116*a* includes a guest virtualization stack 118. In embodiments, via API calls to hierarchical virtualization component 110, guest virtualization stack 118 requests creation of one or more additional "child" guest partitions by hypervisor 108. These "child" guest partitions operate as child VMs within the context of guest partition 113*a*, and utilize resources (e.g., memory, processing) that are donated by guest partition 113*a*. For example, in FIG. 1, there are also a plurality of level-2 (L2) guest partitions, including guest partition 114*a* that executes guest OS 116*b* to guest partition 114*n* that executes guest OS 116*m*. While guest partition 114*a* and guest partition 114*n* are illustrated as executing directly on hypervisor 108 (e.g., as indicated by double-ended arrows connecting those guest partitions with hypervisor 108) a broken box surrounding guest partition 113*a*, guest partition 114*a*, and guest partition 114*n* indicates that guest partition 114*a* and guest partition 114*n* execute within the context of guest partition 113*a*. An ellipsis between guest partition 114*a* and guest partition 114*n* indicates that guest partition 113*a* could create any number of child (L2) guest partitions.

Figure 2:
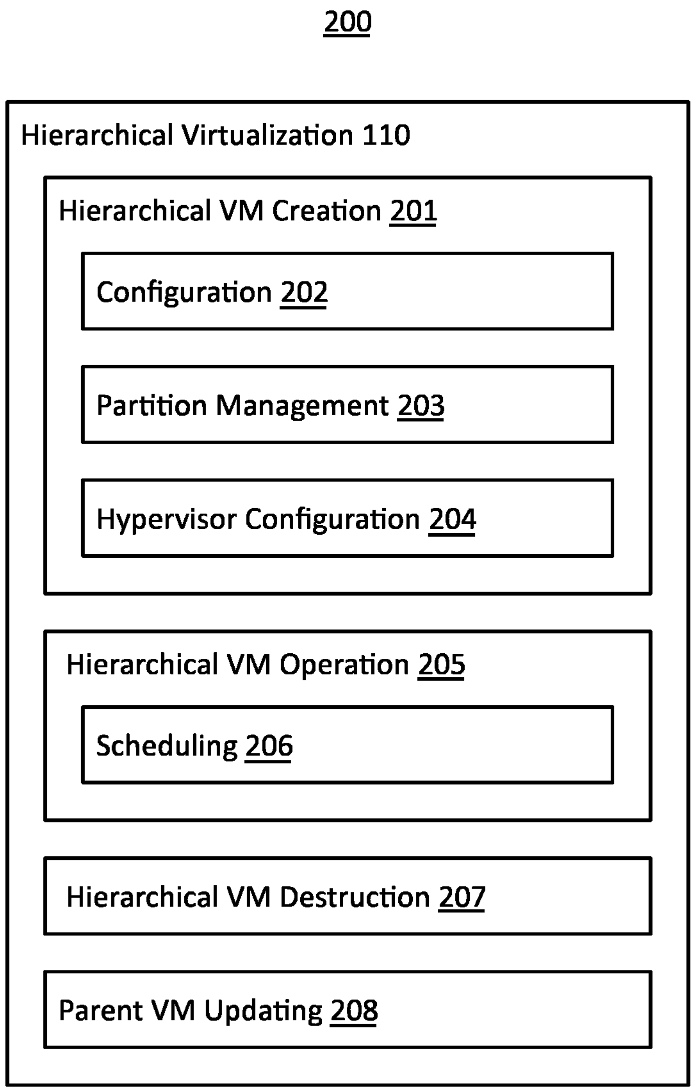
FIG. 2 illustrates an example of internal components of a hierarchical virtualization component.

FIG. 2 illustrates an example 200 of internal elements of hierarchical virtualization component 110 of FIG. 1. Each internal component of hierarchical virtualization component 110 depicted in FIG. 2 represents various functionalities that hierarchical virtualization component 110 might implement in accordance with various embodiments described herein. It will be appreciated, however, that the depicted components—including their identity and arrangement—are presented merely as an aid in describing example embodiments of hierarchical virtualization component 110.

Notably, while hierarchical virtualization component 110 is illustrated as being part of hypervisor 108, for ease in description, in some embodiments the functionality of hierarchical virtualization component 110 is implemented, partially or fully, at root partition 112 (e.g., by host virtualization stack 117). Thus, in some embodiments, hierarchical virtualization component 110 is at least partially implemented at root partition 112.

In FIG. 2, hierarchical virtualization component 110 includes a hierarchical VM creation component 201, which creates a guest partition as a child of a "parent" guest partition, based on a request from that parent guest partition (e.g., guest virtualization stack 118 at guest partition 113*a*). For example, based on a request from guest virtualization stack 118, hierarchical VM creation component 201 creates guest partition 114*a*. As shown, hierarchical VM creation component 201 includes (as examples) a configuration component 202, a partition management component 203, and a hypervisor configuration component 204.

In embodiments, configuration component 202 identifies a configuration specification associated with creation of the requested child guest partition. This configuration specification could be received as part of a request to create a child guest partition, or could be received separately (e.g., via shared memory, using API calls).

In embodiments, a configuration specification includes a set of one or more configuration parameters of the requested child guest partition. Example configuration parameters include a VP topology (e.g., a number of VPs, an arrangement of VP cores into sockets, a NUMA topology) of the child guest partition, features of processor(s) 103 (e.g., a set of one or more instruction set architecture (ISA) extensions) to expose via the child guest partition's VPs, an amount of memory to allocate to the child guest partition, a direct hardware assignment for the child guest partition, permissions for the child guest partition (e.g., whether nested virtualization is allowed), and the like.

In embodiments, a configuration specification also includes a set of one or more configuration parameters of hypervisor 108, as it relates to creating and operating the requested child guest partition. Examples include a subset of enlightenments 111 (hypervisor features that can be utilized by enlightened guest OSs) that hypervisor 108 is to expose to the child guest partition (e.g., which hypervisor features are to be exposed as available to the child guest partition), a hypervisor persona (e.g., a hypervisor identity) to expose to the child guest partition, and the like. In regards to hypervisor persona, in some embodiments hypervisor 108 presents its actual identity to a child guest partition (e.g., a HYPER-V hypervisor can present itself as HYPER-V, using a set of HYPER-V APIs). In other embodiments, hypervisor

108 masquerades as some other hypervisor (e.g., a HYPER-V hypervisor can present itself as KVM, exposing a set of KVM APIs).

In embodiments, a configuration specification also includes an identity of resources that the parent guest partition will be donating for operation of the requested child guest partition. In embodiments, resources can be donated for shared or exclusive use by the child guest partition, or for exclusive use by hypervisor 108. Examples of such resources include a set of one or more memory pages (e.g., identified using parent guest partition GPAs) that the parent guest partition will donate, an identification of processing resource(s) that the parent guest partition will donate (e.g., a VP core, a direct-mapped physical processor core, a percentage of the parent guest partition's processing time), a direct hardware assignment that the parent guest partition will donate, etc. In embodiments, at least a portion of memory pages donated by the parent guest partition are used by the requested child guest partition itself. Additionally, in embodiments, at least a portion of memory pages donated by the parent guest partition are used by hypervisor 108 to maintain management data structures relating to the requested child guest partition (e.g., a SLAT table, VP state).

In embodiments, partition management component 203 creates a requested child guest partition at hypervisor 108, using the resources donated by a parent guest partition. This includes creating any appropriate VPs for the child guest partition, creating a SLAT table mapping memory pages donated by the parent guest partition into a child guest partition memory space, direct-assigning a hardware device to the child guest partition, and the like. In embodiments, a child guest partition SLAT table maps physical memory pages (e.g., addressed by SPAs) to guest memory pages within a memory space of the child guest partition (e.g., addressed by GPAs). In some embodiments, the parent guest partition retains access to these physical memory pages (e.g., a SLAT table for the parent guest partition retains its SPA to GPA mappings). In other embodiments, the parent guest partition loses access to these physical memory pages (e.g., a SLAT table for the parent guest partition loses its SPA to GPA mappings for those memory pages). In embodiments, direct-assigning a hardware device to a child guest partition includes configuring an IOMMU to use a SLAT table for the guest child partition, rather than a SLAT table for the parent guest partition when facilitating DMA operations for a direct-assigned hardware device.

In embodiments, hypervisor configuration component 204 configures hypervisor 108 per the configuration specification, such as to use memory pages donated to hypervisor 108 by the parent guest partition for maintaining data structures related to operation of the child guest partition, to expose one or more specified enlightenments of enlightenments 111 to the requested child guest partition, and/or to expose a specified hypervisor persona to the requested child guest partition. In some such embodiments, the parent guest partition loses access to memory pages donated to hypervisor 108 (e.g., a SLAT table for the parent guest partition loses its SPA to GPA mappings for those memory pages). This ensures that confidential hypervisor state does not leak to the parent guest partition through these donated memory pages.

In FIG. 2, hierarchical virtualization component 110 also includes a hierarchical VM operation component 205. In embodiments, hierarchical VM operation component 205 uses hypervisor 108 to operate both of the parent guest partition and the child guest partition. Thus, rather than operating on a separate hypervisor (as would be the case with nested virtualization), the child guest partition operates on the same hypervisor as its parent.

In FIG. 2, hierarchical VM operation component 205 includes a scheduling component 206, which represents functionality of scheduling the running of VPs for child VMs. In some embodiments, scheduling component 206 makes scheduling decisions on its own. As a result, hypervisor 108 autonomously schedules VPs for child VMs. In some embodiments, a parent partition can provide scheduling component 206 with resource controls to inform scheduling component's 206 scheduling decisions, such as a percentage of the parent guest partition's processing resources to devote to a child VM, a processing cap for a child VM, etc. In other embodiments, scheduling component 206 cooperates with an external scheduler that operates at the parent guest partition (e.g., as part of guest virtualization stack 118). In these embodiments, the parent guest partition is primarily responsible for scheduling VPs for its child VMs.

In FIG. 2, hierarchical virtualization component 110 also includes a hierarchical VM destruction component 207. In embodiments, hierarchical VM destruction component 207 destroys a child guest partition based upon a request from its parent, or when the parent partition is, itself, destroyed. In embodiments, this includes cleaning up any hypervisor data structures relating to the child guest partition, such as a SLAT table.

Figure 3:
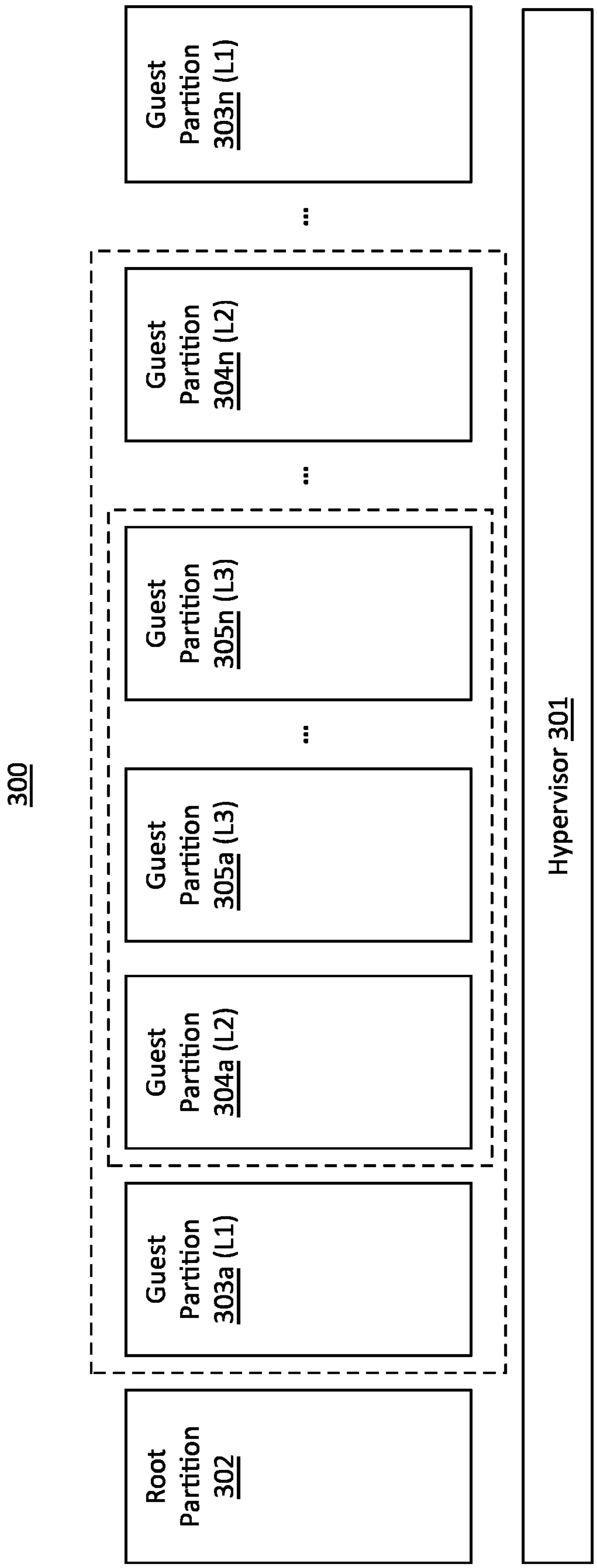
FIG. 3 illustrates an example of multiple levels of hierarchical virtualization.

While only guest partition 113*a* is illustrated in FIG. 1 as including child (L2) guest partitions, it is noted that, in embodiments, any appropriately-configured guest partition (e.g., a guest partition comprising guest virtualization stack 118) can create child guest partitions. For example, while FIG. 1 shows only one level of child guest partitions (e.g., L2 guest partitions), in embodiments, this hierarchical virtualization can operate at any number of levels, such that L1 guest partitions can have children (L2 guest partitions), grandchildren (L3 guest partitions), great-grandchildren (L4 guest partitions), and so on. FIG. 3 illustrates an example 300 of multiple levels of hierarchical virtualization. In example 300, a hypervisor 301 operates a root partition 302, as well as a plurality of L1 guest partitions (e.g., guest partition 303*a* to guest partition 303*n*). Additionally, based on a request from guest partition 303*a*, hypervisor 301 also operates a plurality of L2 guest partitions (e.g., guest partition 304*a* to guest partition 304*n*, which are children of guest partition 303*a*) that utilize resources donated by guest partition 303*a*. Additionally, based on a request from guest partition 304*a*, hypervisor 301 operates a plurality of L3 guest partitions (e.g., guest partition 305*a* to guest partition 305*n*, which are children of guest partition 304*a* and grandchildren of guest partition 303*a*) that utilize resources donated by guest partition 304*a*.

Figure 4:
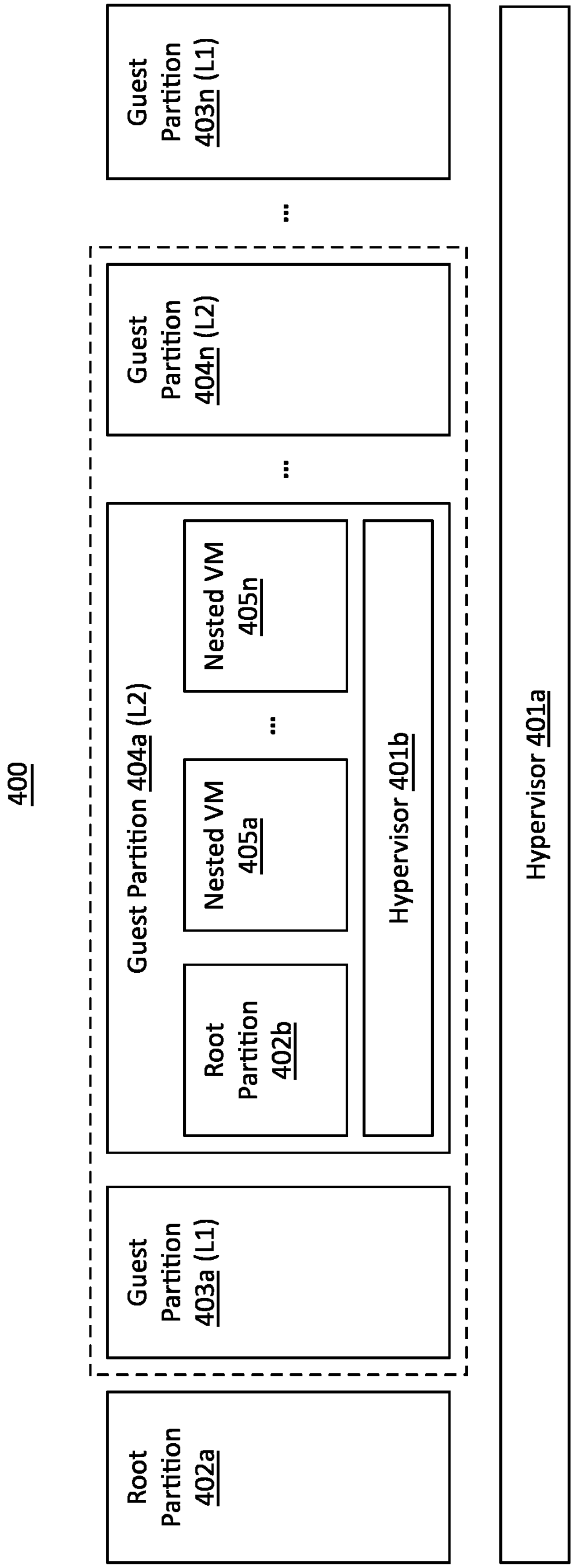
FIG. 4 illustrates an example of hierarchical virtualization combined with nested virtualization.

Additionally, in some embodiments, hierarchical virtualization can be combined with traditional nested virtualization. FIG. 4 illustrates an example 400 of hierarchical virtualization combined with nested virtualization. In example 400 a hypervisor 401*a* operates a root partition 402*a*, as well as a plurality of L1 guest partitions (e.g., guest partition 403*a* to guest partition 403*n*). Additionally, based on a request from guest partition 403*a*, hypervisor 401*a* also operates a plurality of L2 guest partitions (e.g., guest partition 404*a* to guest partition 404*n*, which are children of guest partition 403*a*) that utilize resources donated by guest partition 403*a*. In example 400, rather than using hierarchical virtualization utilizing hypervisor 401*a* to create additional children VMs, guest partition 404*a* comprises hypervisor 401*b*, which operates independently of hypervisor

401*a* within the context of guest partition 404*a*. Hypervisor 401*b* could be of the same type as hypervisor 401*a*, or could be of an entirely different type. Using hypervisor 401*b*, guest partition 404*a* creates a root partition 402*b* and a plurality of nested VMs (e.g., nested VM 405*a* to nested VM 405*n*).

Embodiments are now described in connection with FIGS. 5A and 5B, which illustrates flow charts of an example method 500*a* for creating a child guest partition that shares a hypervisor with a parent guest partition, and an example method 500*b* for operating a child guest partition that shares a hypervisor with a parent guest partition. In embodiments, instructions for implementing method 500*a*, 500*b* are encoded as computer-executable instructions (e.g., hierarchical virtualization component 110) stored on a computer storage media (e.g., storage media 105) that are executable by a processor (e.g., processor(s) 103) to cause a computer system (e.g., computer system 101) to perform method 500*a*, 500*b*.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 5A:
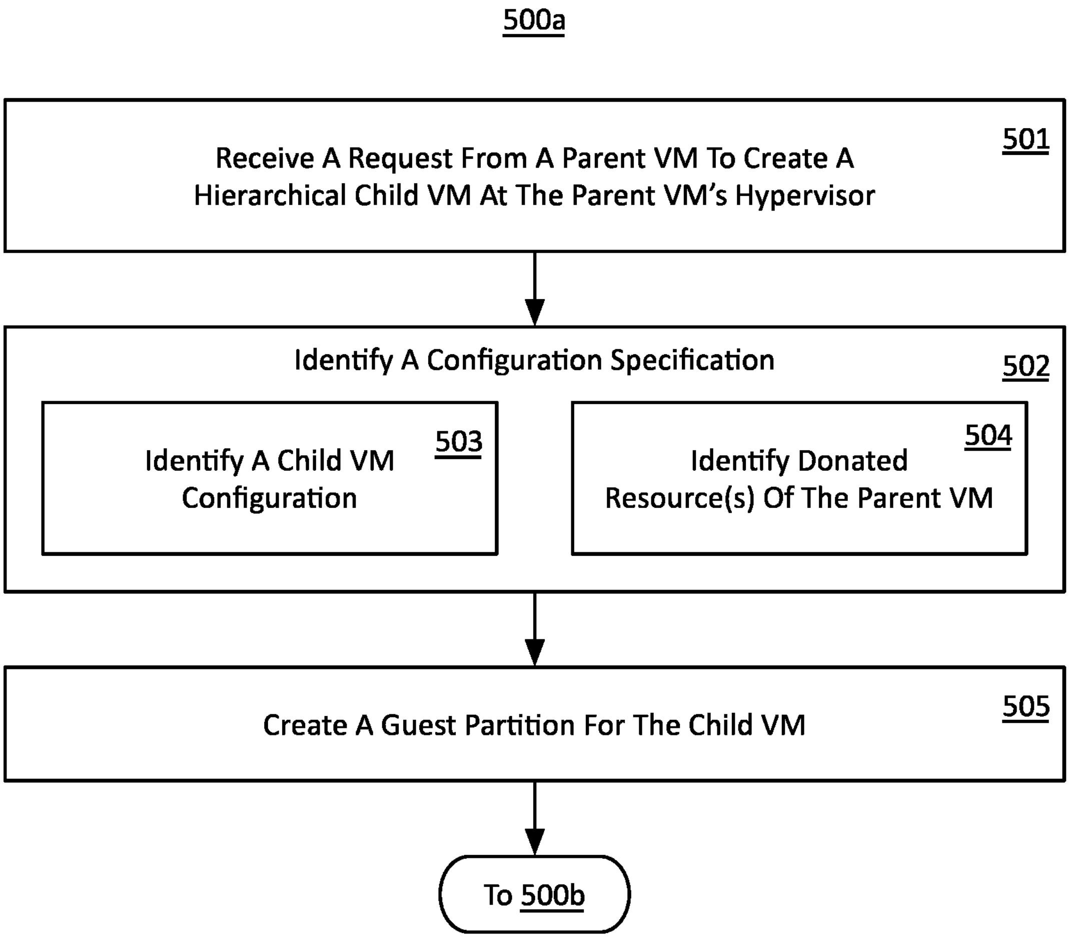
FIGS. 5A and 5B illustrate flow charts of example methods for creating and operating a child guest partition that shares a hypervisor with a parent guest partition.
Figure 5B:
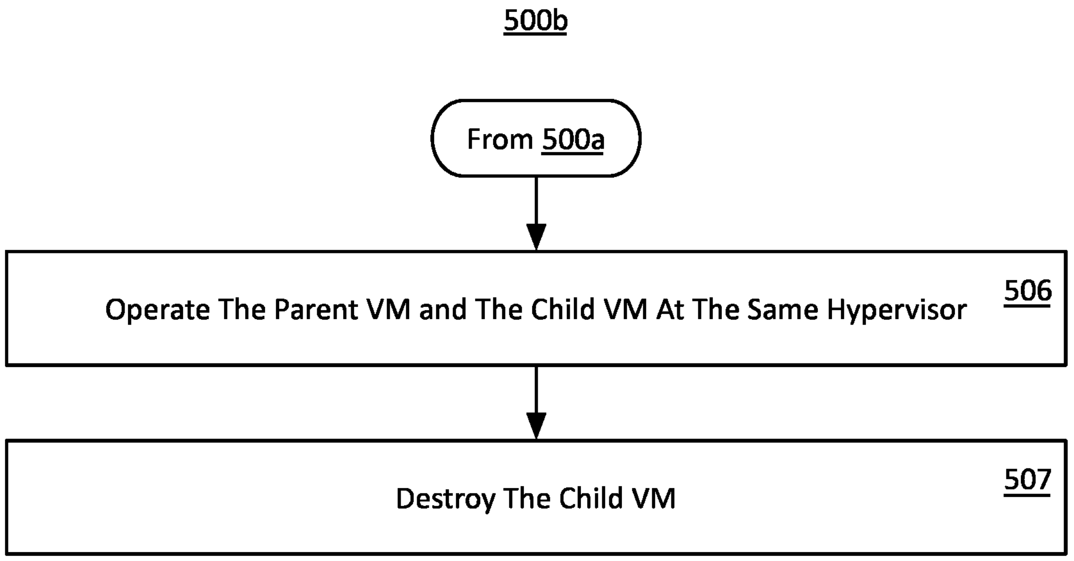

Referring to FIG. 5A, in embodiments, method 500*a* comprises an act 501 of receiving a request from a parent VM to create a hierarchical child VM at the parent VM's hypervisor. In some embodiments, act 501 comprises receiving a request, from a first guest partition that operates at a hypervisor, to create a second guest partition as a child of the first guest partition. In an example, hierarchical VM creation component 201 receives a request from guest partition 113*a* for creation of guest partition 114*a*. In embodiments, this request originates from guest virtualization stack 118 via one or more API calls to hierarchical virtualization component 110.

Method 500*a* also comprises an act 502 of identifying a configuration specification. In an example, configuration component 202 identifies a configuration specification for guest partition 114*a* (e.g., a configuration specification for creation of guest partition 114*a*). In embodiments, this configuration specification is received from guest virtualization stack 118 as part of the request for creation of guest partition 114*a*, from a portion of memory 104 shared between guest partition 113*a* and hypervisor 108, and/or from one or more API calls received from guest virtualization stack 118.

In embodiments, act 502 includes an act 503 of identifying a child VM configuration. In embodiments, act 503 comprises identifying a configuration specification for creation of the second guest partition. As discussed in connection with configuration component 202, in embodiments, a configuration specification includes configuration parameters for the guest partition, itself, such as a VP topology, features of processor(s) 103 to expose via the VPs, an amount of memory to allocate to the requested child guest partition, a direct hardware assignment for the requested child guest partition, permissions for the requested child guest partition, etc. Thus, in some embodiments of act 503, the configuration specification includes one or more of: a configuration of a VP that is to be utilized by the second guest partition, a feature of the VP, an amount of memory associated with to the second guest partition, or a virtualization permission for the second guest partition.

As also discussed in connection with configuration component 202, in embodiments, a configuration specification includes configuration parameters of a hypervisor as it relates to the requested child guest partition, such as one or more enlightenments to expose to the requested child guest partition, a hypervisor persona to expose to the requested child guest partition, etc. Thus, in some embodiments act 503, the configuration specification includes one or more of a hypervisor enlightenment to expose to the second guest partition or a hypervisor persona to expose to the second guest partition.

In embodiments, act 502 includes an act 504 of identifying donated resource(s) of the parent VM. As discussed in connection with configuration component 202, in embodiments a configuration specification includes an identity of resources that the parent guest partition will be donating for operation of the requested child guest partition, such as a set of memory pages that the parent guest partition will donate for operation of the requested child guest partition (e.g., for use by the child guest partition, or for use by the hypervisor), an identification of virtual processing resource(s) that the parent guest partition will donate to the requested child guest partition (e.g., VP core, a direct-mapped physical processor core, a percentage of the parent guest partition's processing time), a direct hardware assignment that the parent guest partition will donate to the requested child guest partition, etc. Thus, in some embodiments of act 503, the configuration specification includes one or more of an identification of a memory portion (which is allocated to the first guest partition) that is to be mapped into the second guest partition; an identification of a memory portion (which is allocated to the first guest partition) that is to be donated to the hypervisor for management of the second guest partition; a virtual processing resource that is to be donated to the second guest partition; or a direct assignment of a physical device (e.g., which is presently owned by the first guest partition) to the second guest partition.

Method 500*a* also comprises an act 505 of creating a guest partition for the child VM. In some embodiments, act 505 comprises creating the second guest partition at the hypervisor based on the set of configuration parameters. In an example, partition management component 203 instructs hypervisor 108 to create guest partition 114*a*, using the resources donated by guest partition 113*a* (e.g., as identified in act 504). Additionally, in embodiments, hypervisor configuration component 204 creates hypervisor data structures (e.g., VP state for one or more VPs associated with guest partition 114*a*, one or more SLAT table(s) associated with guest partition 114*a*) using memory page(s) donated by guest partition 114*a* (e.g., as identified in act 504). Thus, guest partition 114*a* runs based on resources donated by guest partition 113*a*, without needing to operate a separate hypervisor within guest partition 113*a*, as conventional nested virtualization would have required. This means that creation of guest partition 114*a* using the hierarchical virtualization techniques described herein uses fewer memory and processing resources than would have been required if conventional nested virtualization had been used (e.g., memory and processing resources consumed under nested virtualization by an additional hypervisor).

In some embodiments, creating guest partition 114*a* includes creating a SLAT table for guest partition 114*a*, which maps physical memory pages (e.g., addressed by SPAs) to guest memory pages within a memory space of guest partition 114*a* (e.g., addressed by GPAs). Thus, in some embodiments of act 505, creating the second guest partition based on the set of configuration parameters comprises creating a SLAT table for the second guest partition, the SLAT table mapping a SPA associated with the memory portion into a memory space of the second guest partition.

In some embodiments, guest partition 113*a* may donate an entire directly-assigned hardware device (e.g., network interface card, graphical processing unit, storage controller) to guest partition 114*a*. In embodiments, based on this donation, the hypervisor configuration component 204 configures an IOMMU, such that the IOMMU uses a SLAT table for guest partition 114*a*, rather than a SLAT table for guest partition 113*a*, when facilitating DMA operations for that hardware device. Thus, in some embodiments, method 500*a* also comprises configuring an IOMMU to use a SLAT table for the second guest partition in connection with DMA by the physical device, rather than using a SLAT table for the first guest partition.

As mentioned, in embodiments the configuration specification identified in act 502 includes configuration parameters of a hypervisor as it relates to the requested child guest partition, such as one or more enlightenments to expose to the requested child guest partition, a hypervisor persona to expose to the requested child guest partition, etc. Thus, in some embodiments, creating the second guest partition in act 505 comprises configuring the hypervisor to expose a hypervisor enlightenment and/or to expose a hypervisor persona to the second guest partition.

As shown, after method 500*a*, some embodiments proceed to a method 500*b* to operate the newly-created guest partition (child VM). Method 500*b* comprises an act 506 of operating the parent VM and the child VM at the same hypervisor. In some embodiments, act 506 comprises operating the first guest partition and the second guest partition at the hypervisor. In an example, hierarchical VM operation component 205 uses hypervisor 108 to operate each of guest partition 113*a* and guest partition 114*a*. Notably, when guest partition 114*a* generates an interrupt (e.g., for an input/output operation), that interrupt is handled by hypervisor 108, rather than some intermediary hypervisor as would have been required if conventional nested virtualization had been used, leading to improved performance of guest partition 114*a*, as compared to conventional nested virtualization techniques. Additionally, because guest partition 113*a* is not operating a hypervisor under hierarchical virtualization, performance of guest partition 113*a* is also improved, as compared to conventional nested virtualization techniques.

As discussed, in some embodiments, scheduling component 206 autonomously handles scheduling of VPs for child VMs, or cooperates with an external scheduler operating at the child's parent guest partition. Thus, in some embodiments of act 506, operating the first guest partition and the second guest partition at the hypervisor includes scheduling the VP using least one of a first scheduler at the hypervisor, or a second scheduler at the first guest partition. In embodiments, when act 506 includes scheduling the VP using the first scheduler at the hypervisor, the first guest partition provides a VP resource control (e.g., a percentage of the parent's processing resources to devote to a child, a processing cap for a child) used by the first scheduler.

In some embodiments, method 500*b* also comprises an act 507 of destroying the child VM. In embodiments, at some point after act 506, hierarchical VM destruction component 207 destroys guest partition 114*a*. For example, based on a request from guest partition 113*a*, hierarchical VM destruction component 207 destroys guest partition 114*a*. In another example, host OS 115 destroys guest partition 113*a* and, as a result, hierarchical VM destruction component 207 also destroys guest partition 114*a*.

As explained in connection with FIG. 3, hierarchical virtualization can operate any number of levels. In one example, in embodiments, the first guest partition in method 500*a*, 500*b* is an L1 guest partition (e.g., guest partition 303*a*), and the second guest partition in method 500*a*, 500*b* is an L2 guest partition (e.g., guest partition 304*a*). In another example, in embodiments, the first guest partition in method 500*a*, 500*b* is an L2 guest partition (e.g., guest partition 304*a*), and the second guest partition in method 500*a*, 500*b* is an L3 guest partition (e.g., guest partition 305*a*).

In addition to isolating VMs from each other, some hypervisor-based virtualization technologies further operate to isolate VM state (e.g. processor registers, memory) from the root partition and a host OS executing therein. To achieve such isolation, these virtualization technologies restrict which VM resources can be accessed by the host OS (and, in turn, which VM resources can be accessed by the host virtualization stack) to ensure the integrity and confidentiality of a VM's data (e.g., processor register state, memory state). Such a VM is referred to herein as a confidential VM (CVM). Examples of hardware-based technologies that enable CVMs include hardware-based technologies such as software guard extensions (SGX) from INTEL or secure encrypted virtualization secure nested paging (SEV-SNP) from AMD.

Software-based CVMs are also possible. In embodiments, software-based CVMs are implemented based on using SLAT to ensure that a host OS lacks access to one or more memory pages that are assigned to a CVM. Embodiments use SLAT to sub-partition a root partition into a higher-privilege context and a lower-privilege context. The higher-privilege context executes secured components (e.g., a kernel, a CVM service), and the lower-privilege context executes a host OS (e.g., host OS 115) and a host virtualization stack (e.g., host virtualization stack 117). A CVM service operating within the higher-privilege context manages SLAT table(s) for the lower-privilege context, ensuring that lower-privilege context has no SLAT mappings for physical memory pages that are assigned to a software-based CVM (and that should remain isolated from the lower-privilege context). Thus, components operating in the higher-privilege context are within a trusted computing base (TCB) of a software-based CVM, while components operating in the lower-privilege context (e.g., host OS, host virtualization stack) are outside of the TCB of the software-based CVM. In some embodiments, the higher-privilege context and a lower-privilege context are created using virtualization-based security (VBS) technology from MICROSOFT CORPORATION. In these embodiments, the higher-privilege context operates in virtual trust level (VTL) 0, while the lower-privilege context operates in VTL 1.

In embodiments, hierarchical virtualization interoperates with CVM technologies, such as SGX, SEV-SNP, and/or software-based techniques. In embodiments, when a parent guest partition creates a child guest partition, the parent can request that the child be a CVM. In this case, CVM technology is used to isolate memory utilized by the child VM from being accessible to the parent. For example, using software-based techniques, creation of the child VM involves cooperation with a CVM service operating within a higher-privilege context of a root partition, and that CVM service ensures that SLAT table(s) for parent guest partition lack mappings that would give the parent access to physical memory pages that have been donated to the child. Thus, in some embodiments of method 500*a*, 500*b*, a root partition uses SLAT to configure the first guest partition to be outside of a TCB of the second guest partition.

Figure 6A:
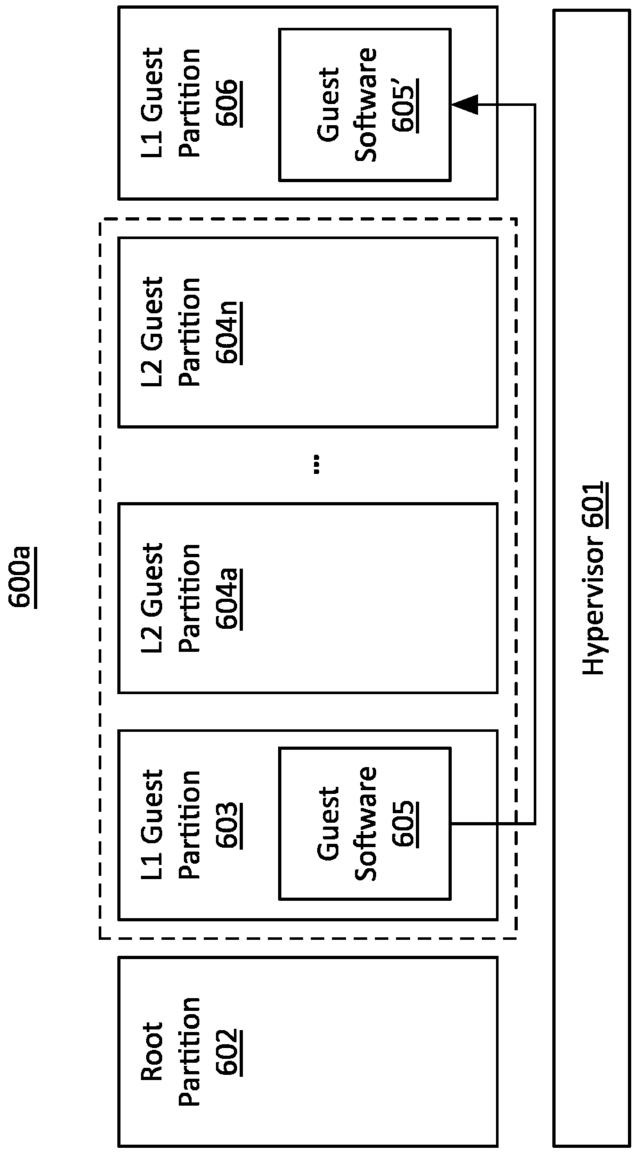
FIGS. 6A and 6B illustrate an example of using live migration to update a parent guest partition without interrupting any child guest partitions.
Figure 6B:
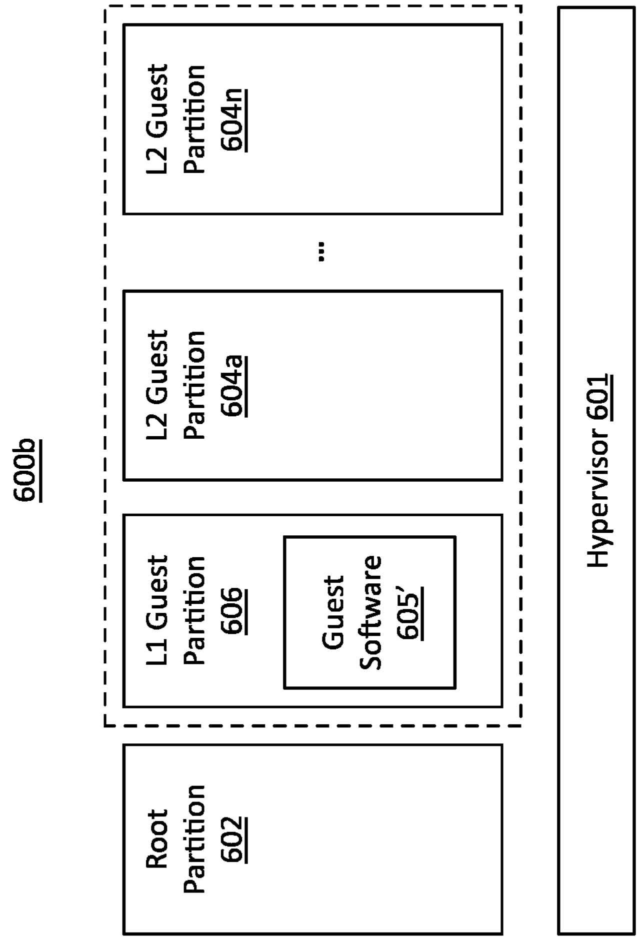

Returning to FIG. 2, in embodiments, hierarchical virtualization component 110 also includes a parent VM updating component 208. In embodiments, parent VM updating component 208 leverages live migration to facilitate updating of parent VM components (e.g., firmware, guest OS, virtualization stack) without disrupting any of its descendants (e.g., children, grand-children, etc.) to restart those components as part of the update. FIGS. 6A and 6B illustrate an example 600 of using live migration to update a parent guest partition without interrupting any child guest partitions.

Referring initially to FIG. 6A, example 600*a* includes a hypervisor 601 operating a root partition 602, a guest partition 603 as an L1 parent, and guest partition 604*a* to guest partition 604*n* as L2 children of guest partition 603. In example 600*a*, the parent VM updating component 208 creates guest partition 606 as a new L1 parent, and uses live migration technology to copy guest partition 603 to guest partition 606. This can include pointing guest partition 606 at an underlying storage device used by guest partition 603, and copying runtime state from guest partition 603 to guest partition 606. Notably, because guest partition 603 and guest partition 606 operate at the same hypervisor, this can be a "zero-copy" operation using pointers, in which memory is not actually copied from one location to another. Once guest partition 603 has been copied to guest partition 606, guest partition 603 remains operating while updates are applied to guest partition 606. This is indicated in example 600*a* as guest software 605 at guest partition 603 becoming guest software 605' at guest partition 606.

Turning to FIG. 6B, example 600*b* shows that, once guest partition 606 has been updated, the original guest partition (e.g., guest partition 603) is destroyed and the new guest partition (e.g., guest partition 606) becomes owner of the original guest partition's children.

Thus, in some embodiments, method 500*b* further comprises upgrading a guest software (e.g., guest software 605) at the first guest partition (e.g., guest partition 603) based on live migrating the first guest partition into a third guest partition (guest partition 606) operating at the hypervisor; upgrading the guest software at the third guest partition; and after upgrading the guest software at the third guest partition moving ownership of the second guest partition (e.g., guest partition 604*a*) to the third guest partition and destroying the first guest partition.

Embodiments of the disclosure may comprise or utilize a special-purpose or general-purpose computer system (e.g., computer system 101) that includes computer hardware, such as, for example, a processor system (e.g., processor(s) 103) and system memory (e.g., memory 104), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 105). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 106), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more virtualization hosts (e.g., computer system 101) that are each capable of running one or more virtual machines. During operation, virtual machines emulate an operational computing system, supporting an operating system and perhaps one or more other applications as well. In some embodiments, each virtualization host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor system, comprising:

receiving a request at a hypervisor, wherein the request is received from a first guest partition that operates at the hypervisor, and requests to create a second guest partition as a child of the first guest partition;

identifying, by the hypervisor, a configuration specification for the second guest partition, the configuration specification including:

an identification of a memory portion, which is allocated to the first guest partition, that is to be mapped into the second guest partition, and a virtual processor (VP) configuration that is to be utilized by the second guest partition;

creating, at the hypervisor, the second guest partition, based on the configuration specification, wherein the second guest partition executes directly on the hypervisor;

creating, at the hypervisor, a VP for the second guest partition based on the VP configuration;

scheduling, by the hypervisor, the VP for the second guest partition for execution on physical processor resources according to a hypervisor-controlled scheduling policy that is independent of any scheduling decisions made within the first guest partition; and moving ownership of the second guest partition from the first guest partition to a third guest partition operating at the hypervisor, wherein execution of the second guest partition is maintained without interruption during the moving ownership to the third guest partition.

2. The method of claim 1, wherein the configuration specification also includes at least one of:

a feature of the VP, a hypervisor enlightenment to expose to the second guest partition, a hypervisor persona to expose to the second guest partition, or a virtualization permission for the second guest partition.

3. The method of claim 1, wherein creating the second guest partition at the hypervisor based on the configuration specification comprises creating a second level address translation (SLAT) table for the second guest partition, the SLAT table mapping a system physical address (SPA) associated with the memory portion into a memory space of the second guest partition.

4. The method of claim 1, wherein the first guest partition provides a VP resource control used by a scheduler at the hypervisor.

5. The method of claim 1, wherein:

the memory portion is a first memory portion; and the configuration specification includes a second memory portion, which is allocated to the first guest partition, that is to be donated to the hypervisor for management of the second guest partition.

6. The method of claim 1, wherein the configuration specification includes a direct assignment of a physical device to the second guest partition, the method further comprising:

configuring an input/output memory management unit (IOMMU) to use a second level address translation (SLAT) table for the second guest partition in connection with direct memory access (DMA) by the physical device, rather than using a SLAT table for the first guest partition.

7. The method of claim 1, wherein the request is a first request, the configuration specification is a first configuration specification, the memory portion is a first memory portion, and the VP is a first VP, the method further comprising:

receiving a second request at the hypervisor, wherein the request is received from the second guest partition, and requests to create a third guest partition as a child of the second guest partition;

identifying, by the hypervisor, a second configuration specification for creation of the third guest partition, the second configuration specification including:

an identification of a second memory portion, which is allocated to the second guest partition, that is to be mapped into the third guest partition, and a second VP configuration that is to be utilized by the third guest partition;

creating, at the hypervisor, the third guest partition, based on the second configuration specification, wherein the third guest partition executes directly on the hypervisor;

creating, at the hypervisor, a second VP for the third guest partition based on the second VP configuration; and scheduling, by the hypervisor, the second VP for the third guest partition for execution on physical processor resources according to a hypervisor-controlled scheduling policy that is independent of any scheduling decisions made within the second guest partition.

8. The method of claim 1, wherein a root partition uses second level address translation (SLAT) to configure the first guest partition to be outside of a trusted computing base (TCB) of the second guest partition.

9. The method of claim 1, further comprising, prior to the moving ownership of the second guest partition to the third guest partition, upgrading a guest software at the first guest partition based on:

live migrating the first guest partition into the third guest partition;

upgrading the guest software at the third guest partition; and after upgrading the guest software at the third guest partition:

performing the moving ownership of the second guest partition to the third guest partition; and destroying the first guest partition.

10. A computer system, comprising:

a processor; and a computer-readable storage medium that stores computer-executable instructions representing a hypervisor that are executable by the processor to at least:

receive a request at the hypervisor, wherein the request is received from a first guest partition that operates at the hypervisor, and requests to create a second guest partition as a child of the first guest partition;

identify, by the hypervisor, a configuration specification for the second guest partition, the configuration specification including:

an identification of a memory portion, which is allocated to the first guest partition, that is to be mapped into the second guest partition, and a virtual processor (VP) configuration that is to be utilized by the second guest partition;

create, at the hypervisor, the second guest partition, based on the configuration specification, wherein the second guest partition executes directly on the hypervisor;

create, at the hypervisor, a VP for the second guest partition based on the VP configuration;

schedule, by the hypervisor, the VP for the second guest partition for execution on physical processor resources according to a hypervisor-controlled scheduling policy that is independent of any scheduling decisions made within the first guest partition; and move, by the hypervisor, ownership of the second guest partition from the first guest partition to a third guest partition operating at the hypervisor, wherein execution of the second guest partition is maintained without interruption during the moving ownership to the third guest partition.

11. The computer system of claim 10, wherein the configuration specification also includes at least one of:

a feature of the VP, a hypervisor enlightenment to expose to the second guest partition, a hypervisor persona to expose to the second guest partition, or a virtualization permission for the second guest partition.

12. The computer system of claim 10, wherein creating the second guest partition at the hypervisor based on the configuration specification comprises creating a second level address translation (SLAT) table for the second guest partition, the SLAT table mapping a system physical address (SPA) associated with the memory portion into a memory space of the second guest partition.

13. The computer system of claim 10, wherein the first guest partition provides a VP resource control used by a scheduler at the hypervisor.

14. The computer system of claim 10, wherein:

the memory portion is a first memory portion; and the configuration specification includes a second memory portion, which is allocated to the first guest partition, that is to be donated to the hypervisor for management of the second guest partition.

15. The computer system of claim 10, wherein:

the configuration specification includes a direct assignment of a physical device to the second guest partition; and the computer-executable instructions are also executable by the processor to configure an input/output memory management unit (IOMMU) to use a second level address translation (SLAT) table for the second guest partition in connection with direct memory access (DMA) by the physical device, rather than using a SLAT table for the first guest partition.

16. The computer system of claim 10, wherein a root partition uses second level address translation (SLAT) to configure the first guest partition to be outside of a trusted computing base (TCB) of the second guest partition.

17. The computer system of claim 10, wherein the computer-executable instructions are also executable by the processor to, prior to the moving ownership of the second guest partition to the third guest partition, upgrade a guest software at the first guest partition based on:

live migrating the first guest partition into the third guest partition;

upgrading the guest software at the third guest partition; and after upgrading the guest software at the third guest partition:

performing the moving ownership of the second guest partition to the third guest partition; and destroying the first guest partition.

18. A non-transitory computer-readable storage medium that stores computer-executable instructions representing a hypervisor that are executable by a processor to at least:

receive a request at the hypervisor, wherein the request is received from a first guest partition that operates at the hypervisor, and requests to create a second guest partition as a child of the first guest partition;

identify, by the hypervisor, a configuration specification for the second guest partition, the configuration specification including:

an identification of a memory portion, which is allocated to the first guest partition, that is to be mapped into the second guest partition, and a virtual processor (VP) configuration that is to be utilized by the second guest partition;

create, at the hypervisor, the second guest partition, based on the configuration specification, wherein the second guest partition executes directly on the hypervisor;

create, at the hypervisor, a VP for the second guest partition based on the VP configuration;

schedule, by the hypervisor, the VP for the second guest partition for execution on physical processor resources according to a hypervisor-controlled scheduling policy that is independent of any scheduling decisions made within the first guest partition; and move, by the hypervisor, ownership of the second guest partition from the first guest partition to a third guest partition operating at the hypervisor, wherein execution of the second guest partition is maintained without interruption during the moving ownership to the third guest partition.

19. The non-transitory computer-readable storage medium of claim 18, wherein the first guest partition provides a VP resource control used by a scheduler at the hypervisor.

20. The non-transitory computer-readable storage medium of claim 18, wherein the computer-executable instructions are also executable by the processor to, prior to the moving ownership of the second guest partition to the third guest partition, upgrade a guest software at the first guest partition based on:

live migrating the first guest partition into the third guest partition;

upgrading the guest software at the third guest partition; and after upgrading the guest software at the third guest partition:

performing the moving ownership of the second guest partition to the third guest partition; and destroying the first guest partition.

* * * * *